US012595123B2

(12) United States Patent
Rollwa

(10) Patent No.: US 12,595,123 B2
(45) Date of Patent: Apr. 7, 2026

(54) BLOCK STORAGE ARRANGEMENT AND METHOD FOR OPERATING A BLOCK STORAGE ARRANGEMENT

(71) Applicant: Jungheinrich Aktiengesellschaft, Hamburg (DE)

(72) Inventor: Volker Rollwa, Pirmasens (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 344 days.

(21) Appl. No.: 18/212,401

(22) Filed: Jun. 21, 2023

(65) Prior Publication Data

US 2023/0415990 A1      Dec. 28, 2023

(30) Foreign Application Priority Data

Jun. 22, 2022    (EP) .................................... 22180290

(51) Int. Cl.
*B65G 1/04* (2006.01)
*A01G 9/24* (2006.01)

(52) U.S. Cl.
CPC .............. *B65G 1/0471* (2013.01); *A01G 9/24* (2013.01)

(58) Field of Classification Search
CPC .......... B65G 1/04; B65G 1/0471; A01G 9/24
USPC ........................................ 414/266
See application file for complete search history.

(56) References Cited

U.S. PATENT DOCUMENTS

| | | | | |
|---|---|---|---|---|
| 4,764,074 A | * | 8/1988 | Postigo ................ | B65G 57/303 414/795.2 |
| 7,344,348 B2 | * | 3/2008 | Freudelsperger .... | B65G 1/0435 414/280 |
| 11,261,026 B2 | * | 3/2022 | Cavelius ................ | B65G 57/02 |
| 12,110,184 B2 | * | 10/2024 | Becker ................ | B65G 57/302 |
| 2021/0052070 A1 | * | 2/2021 | Cavelius ................ | B65G 1/02 |
| 2022/0063916 A1 | * | 3/2022 | Becker .................... | B65G 1/14 |
| 2023/0108952 A1 | * | 4/2023 | Clarke ................ | G06F 1/3203 414/217 |

FOREIGN PATENT DOCUMENTS

| | | | | |
|---|---|---|---|---|
| CA | 3204570 A1 | * | 12/2023 | .......... B65G 57/302 |
| CN | 111153220 | | 5/2020 | |
| CN | 111153220 A | * | 5/2020 | .......... B65G 57/302 |

(Continued)

OTHER PUBLICATIONS

Europe Office Action conducted in counterpart Europe Appln. No. 22180290.3 (Jan. 31, 2024).

(Continued)

*Primary Examiner* — Terrell H Matthews
(74) *Attorney, Agent, or Firm* — GREENBLUM & BERNSTEIN, P.L.C.

(57) ABSTRACT

A block storage arrangement and method. The block storage arrangement includes at least one block storage element receiving space; a loading space arranged below the block storage element receiving space; an opening, which is arranged between the block storage element receiving space and the loading space, having a holding device, so that a direction from the loading space into the block storage element receiving space defines an insertion direction, and a centering device, which is arranged in the block storage element receiving space, that is movable in the insertion direction in the block storage element receiving space.

20 Claims, 3 Drawing Sheets

(56)     References Cited

FOREIGN PATENT DOCUMENTS

| EP | 3 782 931 | | 2/2021 | | |
| EP | 3782931 | A1 * | 2/2021 | ............. | B65D 85/62 |
| EP | 4238898 | A1 * | 9/2023 | ........... | B65G 1/0471 |
| JP | S59-183875 | | 10/1984 | | |
| KR | 10-2280 791 | | 7/2021 | | |
| KR | 102280791 | B1 * | 7/2021 | ........... | B65G 1/0471 |

OTHER PUBLICATIONS

Europe Extended Search Report conducted in counterpart Europ
Appln. No. 22180290.3, dated Dec. 12, 2022.

* cited by examiner

BLOCK STORAGE ARRANGEMENT AND METHOD FOR OPERATING A BLOCK STORAGE ARRANGEMENT

CROSS-REFERENCE TO RELATED APPLICATION

This application claims priority under 35 U.S.C. § 119(a) to Europe Application No. 22 18 0290.3 filed Jun. 22, 2022, the disclosure of which is expressly incorporated by reference herein in its entirety.

BACKGROUND

1. Field of the Invention

Embodiments relate to a block storage arrangement having at least one block storage element receiving space and a loading space arranged below the block storage element receiving space, an opening having a holding device being arranged between the block storage element receiving space and the loading space and a direction from the loading space into the block storage element receiving space forming an insertion direction.

Furthermore, embodiments relate to a method for operating a block storage arrangement includes at least one block storage element receiving space and a loading space arranged below the block storage element receiving space in the direction of gravity, in which a block storage element is moved into the block storage element receiving space from the loading space through an opening.

2. Discussion of Background Information

A block storage arrangement can be used to accommodate as large a number of block storage elements as possible in a predetermined space. The block storage elements, for example containers or plant carriers, are arranged in the block storage element receiving space in the form of a stack. Thus, the block storage elements are close to one another in the direction of gravity so that no space is lost in the direction of gravity. A plurality of block storage element receiving spaces can likewise be arranged close to one another transversely to the direction of gravity because no handling space is required between the individual block storage element receiving spaces. Rather, the block storage elements are inserted into one of the block storage element receiving spaces from below through the loading space and are also removed downward from the block storage element receiving space.

A block storage arrangement can be used as storage in which a large number of products are stored and in which the block storage elements are designed as containers. Each container can then receive one or more products to be stored. However, the block storage arrangement can also be designed as a greenhouse arrangement. In this case, the block storage elements are designed as plant carriers which, if necessary, are not only open upward in the direction of gravity, but also have openings on the sides transversely to the direction of gravity.

A block storage arrangement can have a considerable height, and therefore a stack of block storage elements can also have a correspondingly great height. A stack of block storage elements with a height of more than 10 m is certainly realistic.

The block storage elements are subject to a certain tolerance, irrespective of whether they are containers or plant carriers. This can cause a stack of block storage elements to tilt in the block storage receiving space, as a result of which great lateral forces can act on a frame in which the block storage element receiving space is formed. If the block storage elements are plant carriers, tilting additionally has the negative effect that not all plants are uniformly supplied with water or another nutrient liquid when the plants are watered in the plant carrier.

SUMMARY

Embodiments reliably operate a block storage arrangement.

In embodiments, a block storage arrangement of the type mentioned at the outset in that a centering device is arranged in the block storage element receiving space and can be moved in the insertion direction in the block storage element receiving space.

The cross section of the block storage element receiving space must be somewhat larger than the cross section of the block storage elements so that the block storage elements can move in the insertion direction in the block storage element receiving space. This condition results from the fact that the elements which define the block storage element receiving space, such as posts, are also subject to a certain tolerance, which must be added to the tolerances of the block storage elements. However, the centering device can be substantially better adapted to the cross section of the block storage element receiving space and hold a block storage element, which is placed on the centering device from below, in a region in which the risk of a stack of block storage elements tilting is lower. If the stack then grows upward from below, the centering device is raised and always holds the uppermost block storage element in the predetermined region. Since the block storage elements are engaged in one another in the stack, the block storage elements arranged below the centering device in the direction of gravity are thus also automatically held in the desired region so that tilting of the stack of block storage elements is not excluded. The angle at which the stack can tilt, however, is significantly reduced, and therefore, in the case of then only slight tilting of the stack consisting of block storage elements, there is no longer any risk for the elements which form the block storage element receiving space. Slight tilting is also permitted in a plant carrier, for which tilting is then so slight that all plants received in the plant carrier are uniformly watered.

Preferably, a plurality of surfaces extending in the insertion direction are arranged at the edge of the block storage element receiving space and the centering device interacts with the surfaces. The centering device can then be supported on the surfaces and the centering device is therefore prevented from moving transversely to the direction of gravity in the block storage element receiving space.

In this case, it is preferable for the surfaces to be arranged on posts which extend in the insertion direction. A block storage arrangement often has posts between which the block storage element receiving spaces are arranged. Said posts can then be used simultaneously for supporting the centering device.

Preferably, at least some posts are connected to one another transversely to the insertion direction. The posts thus stabilize one another.

Preferably, the posts are arranged at corners of the opening. Thus, the posts are automatically also located at corners of the block storage element receiving space and the centering device can be supported at the corners of the block storage element receiving space.

In a preferred embodiment, the centering device has a base with a peripheral contour which is adapted to the shape of the opening, at least one centering element which projects beyond the peripheral contour being arranged above the base in the direction of gravity. If a block storage element is not yet arranged in the block storage element receiving space, then the base of the centering device is located in the opening and is held there by the holding device. The base is then positioned very precisely through the opening. Above the opening, however, the block storage element receiving space has a larger cross-sectional area in order to allow for the tolerances to which the elements forming the block storage arrangement and also the block storage elements are subject. Since the centering element projects beyond the peripheral contour, i.e., projects beyond the peripheral contour of the base transversely to the direction of gravity, the centering device can also be held in its position by the centering element when the centering device has been pushed out of the opening by a block storage element.

Preferably, the centering element is connected to a preloading device which acts outwardly on the centering element with a force component transversely to the insertion direction. In this case, it is possible to insert the centering device into the block storage element receiving space from below through the opening. During this process, the centering element can be moved inward against the force of the preloading device so that the centering device fits through the opening. As soon as the centering device has been moved into the opening and the centering element projects upward from the opening in the direction of gravity, the centering element can be moved outward by the preloading device and then interact with the surfaces in order to support the centering device in the block storage element receiving space.

In this case, it is preferable for the centering element to interact with a locking device. It is then no longer dependent on the force of the preloading device being sufficient to hold the stack consisting of block storage elements in the central position. The preloading device is then only used to move the centering element far enough outward. It is then locked in this position by the locking device.

In this case, it is preferable for the locking device to interact with an actuating device which can be activated from below in the direction of gravity. It is thus possible to activate the locking device by introducing a block storage element into the block storage element receiving space from below through the opening. In this case, the block storage element acts on the centering device and not only pushes it upward in the insertion direction, but also acts on the locking device by the actuating device and then locks the centering element in a centering position.

In this case, it is preferable for the actuating device to project downward from the base in the direction of gravity. In this case, the actuating device can come to rest on the actuating device by a block storage element, which is inserted into the opening from below, and then moves said device upward in the direction of gravity when the block storage element is raised. Thus, when the first block storage element is inserted into the block storage element receiving space, it is automatically ensured that the centering device is in the desired central position.

In this case, it is preferable for the centering element to have a roller. This means that when the block storage elements are moved in the insertion direction, there are no major frictional losses caused by the centering device.

Rather, the roller can roll with relatively small resistance, without presenting significant resistance against a movement of the block storage elements.

In this case, it is preferable for the roller to have a running surface which is made of an elastomer material. The elastomer material is able to compensate for slightly uneven points on a surface over which the roller rolls. This prevents the centering device from being blocked during a movement.

A block storage element is preferably arranged below the centering device in the direction of gravity and engages form-fittingly in the centering device. The engagement by a form-fitting connection has the effect that the block storage element cannot move transversely to the insertion direction relative to the centering device, and therefore it is automatically ensured by the form-fitting engagement that the block storage element is correctly positioned relative to the centering device. A form-fitting engagement of this kind can be produced relatively easily when the block storage element is inserted into the opening because the centering device is aligned relatively precisely in the opening and the block storage element is positioned with the same precision when introduced into the opening. These matching accuracies are sufficient to achieve a form fit between the block storage element and the centering device.

The object is achieved by a method of the type mentioned at the outset in that the block storage element is brought into engagement with a centering device arranged in the block storage element receiving space and the centering device is also raised when the block storage element is raised in the block storage element receiving space.

As already explained above, the centering device can be held in a central (or another desired) position in the block storage element receiving space with relatively little effort. If a block storage element is then inserted into the block storage element receiving space and is in engagement with the centering device, it is automatically ensured that the block storage element is likewise located in the desired position and cannot move transversely to the insertion direction. Each subsequent block storage element that is placed from below into a stack of block storage elements already located in the block storage element receiving space is then held in the desired region by each block storage element located there above so that the stack of block storage elements can be prevented from tilting beyond a predetermined amount with great reliability.

In this case, it is preferable for at least one centering element of the centering device to be locked in a position projecting outward beyond a base of the centering device when the block storage element is placed on the centering device. As long as a block storage element is not inserted into the block storage element receiving space, the centering device is held in the opening between the loading space and the block storage element receiving space only by its position. Only when the centering device is moved out of this position by a block storage element placed from below does the centering element come into action and then ensure the desired position of the centering device in the block storage element receiving space.

Embodiments are directed to a block storage arrangement that includes at least one block storage element receiving space; a loading space arranged below the block storage element receiving space; an opening, which is arranged between the block storage element receiving space and the loading space, having a holding device, where a direction from the loading space into the block storage element receiving space defines an insertion direction, and a centering device, which is arranged in the block storage element receiving space, is movable in the insertion direction in the block storage element receiving space.

According to embodiments, a plurality of surfaces extending in the insertion direction can be arranged at edges of the block storage element receiving space and the centering device can interact with the plurality of surfaces. The plurality of surfaces may be arranged on posts extending in the insertion direction. At least some the posts may be connected to one another transversely to the insertion direction. Further, the posts can be arranged at corners of the opening.

In embodiments, the centering device may have a base with a peripheral contour which is adapted to a shape of the opening and at least one centering element arranged above the base in the direction of gravity that projects beyond the peripheral contour. The block storage arrangement may further include a preloading device coupled to the centering element to apply a force component transversely to the insertion direction outwardly on the centering element. The block storage arrangement can also include a locking device arranged to interact with the centering element. Moreover, the block storage arrangement can include an actuating device, which is activatable from below in the direction of gravity and is arranged to interact with the locking device. The actuating device may project downward from the base in the direction of gravity.

In accordance with embodiments, the centering element may have a roller. Further, the roller can have a running surface formed on an elastomer material.

In other embodiments, a block storage element may be positionable below the centering device in the direction of gravity to form-fittingly engage in the centering device.

Embodiments are directed to a method for operating a block storage arrangement that includes at least one block storage element receiving space and a loading space arranged below the block storage element receiving space in a direction of gravity. The method includes moving a block storage element into the block storage element receiving space from the loading space through an opening. In moving through the opening, the block storage element engages a centering device arranged in the block storage element receiving space and raises the centering device.

According to other embodiments, the method can further include locking at least one centering element of the centering device in a position projecting outwardly beyond a base of the centering device while the centering device is supported on the block storage element.

In still other embodiments, the block storage element may initially engage an actuation device of the centering device that moves at least one centering element outwardly in a direction transversely to the direction of gravity to engage at least one surface. The at least one centering element can include a roller. Further, the block storage element receiving space may be defined by posts, the at least one surface may include a surface extending along a length of each post, and the at least one centering element can include a roller arranged to roll over each surface in the direction of gravity.

In accordance with still yet other embodiments, before the block storage element is moved into the block storage element receiving space, the method may further include moving the centering device from the loading space to the block storage element receiving space through the opening; and supporting the centering device on a holding device in the opening. Moreover, in moving the centering device through the opening, at least one centering element of the centering device can be arranged in a retracted position to facilitate moving through the opening.

Other exemplary embodiments and advantages of the present invention may be ascertained by reviewing the present disclosure and the accompanying drawing.

BRIEF DESCRIPTION OF TH E DRAWINGS

The invention is described below with reference to preferred exemplary embodiments in conjunction with the drawings, in which.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figures 1, 2, 3, 4:
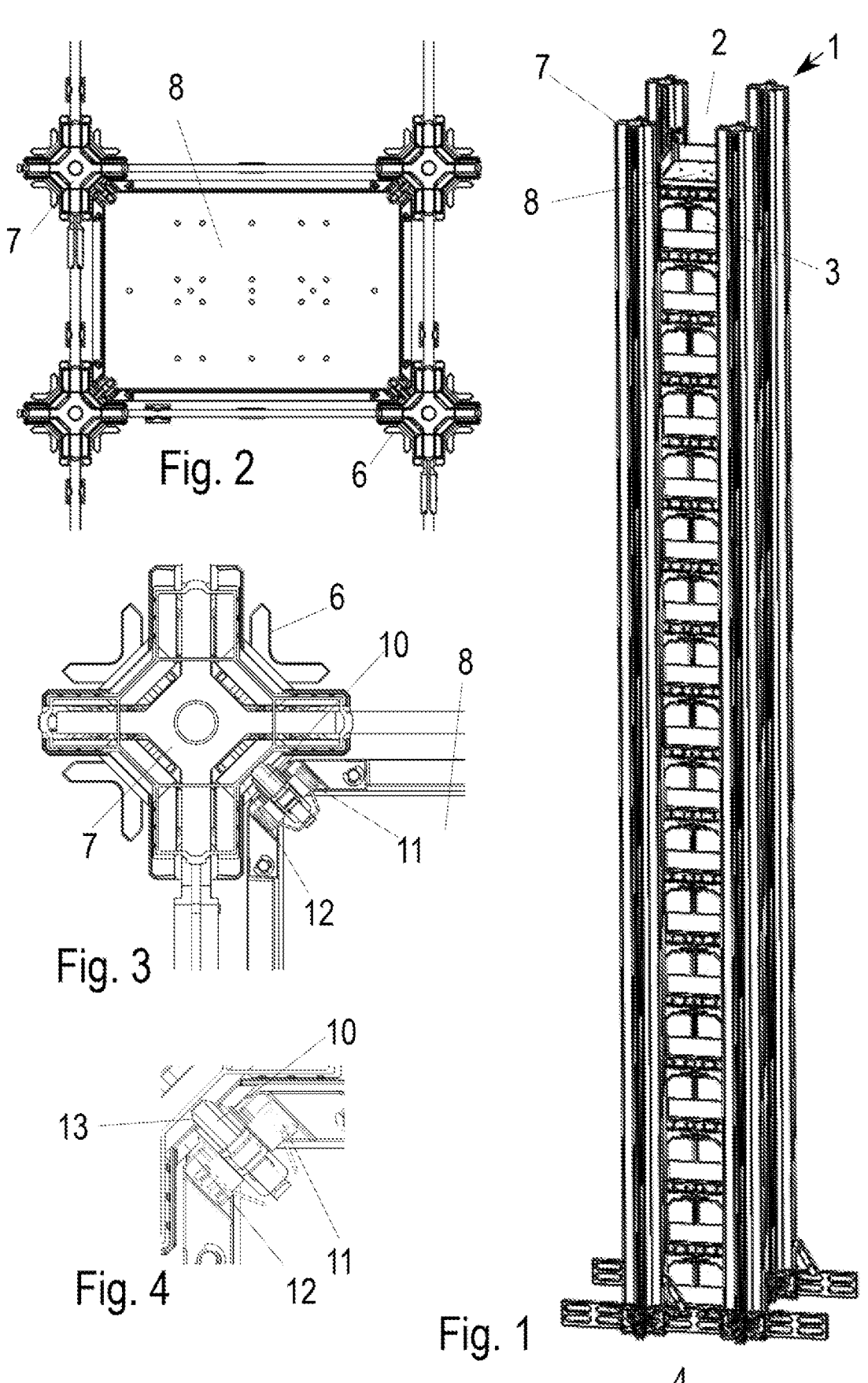
FIG. 1 shows a block storage element receiving space with a stack of block storage elements.
FIG. 2 shows a plan view of the block storage element receiving space.
FIG. 3 shows a detail of the plan view.
FIG. 4 shows a variation of the detail according to FIG. 3.

FIG. 1 shows, in a highly schematic manner, a part of a block storage arrangement 1 comprising a block storage element receiving space 2 in which a plurality of block storage elements 3 are arranged in the form of a stack. A loading space 4 is arranged below the block storage element receiving space 2. An opening 5 (FIG. 5) is arranged between the block storage element receiving space 2 and the loading space 4. A holding device 6 is arranged in the opening (FIG. 3), by which a block storage element 3 can be held in the container receiving space 2 in such a way that there is still sufficient space below the container receiving space 2 to position an additional block storage element 3 together with a loading vehicle (not shown) and insert the additional block storage element 3 into the block storage element receiving space 2. In the present case, the holding device 6 is formed by holding latches which are arranged at the corners of the opening 5. The holding latches can be pivoted from the holding position shown in FIG. 3, in which they hold a block storage element 3, into a release position so that a block storage element 3 can be moved past the holding device 6 downward into the loading space.

As can be seen in FIG. 1, the stack of block storage elements 3 can have a considerable height. This height can be 10 m or more. Since the block storage elements 3 are subject to a certain tolerance, there is the risk that the stack of block storage elements 3 will tilt in the block storage element receiving space 2. This can result in the stack of block storage elements 3 pressing against posts 7 which are arranged at corners of the block storage element receiving space 2. It is desirable to avoid this.

If the block storage elements 3 are designed as containers, it is desirable to avoid an impermissibly high lateral force on the posts 7. If the block storage elements 3 are designed as plant carriers, it is also desirable to prevent the stack from tilting in order to ensure that all plants received in the plant carrier can be watered uniformly. This would no longer be ensured if the stack of block storage elements 3 were to tilt.

In order to limit tilting of the stack of block storage elements 3 in the container receiving space 2 to a permissible dimension, a centering device 8 is arranged in the container receiving space 2 (also see FIG. 2) and can be moved in the block storage element receiving space 2, specifically in the direction in which the block storage elements 3 can also be moved in the container receiving space 2. This direction is also referred to as an "insertion direction". The insertion direction corresponds to the direction of gravity.

Figure 5:
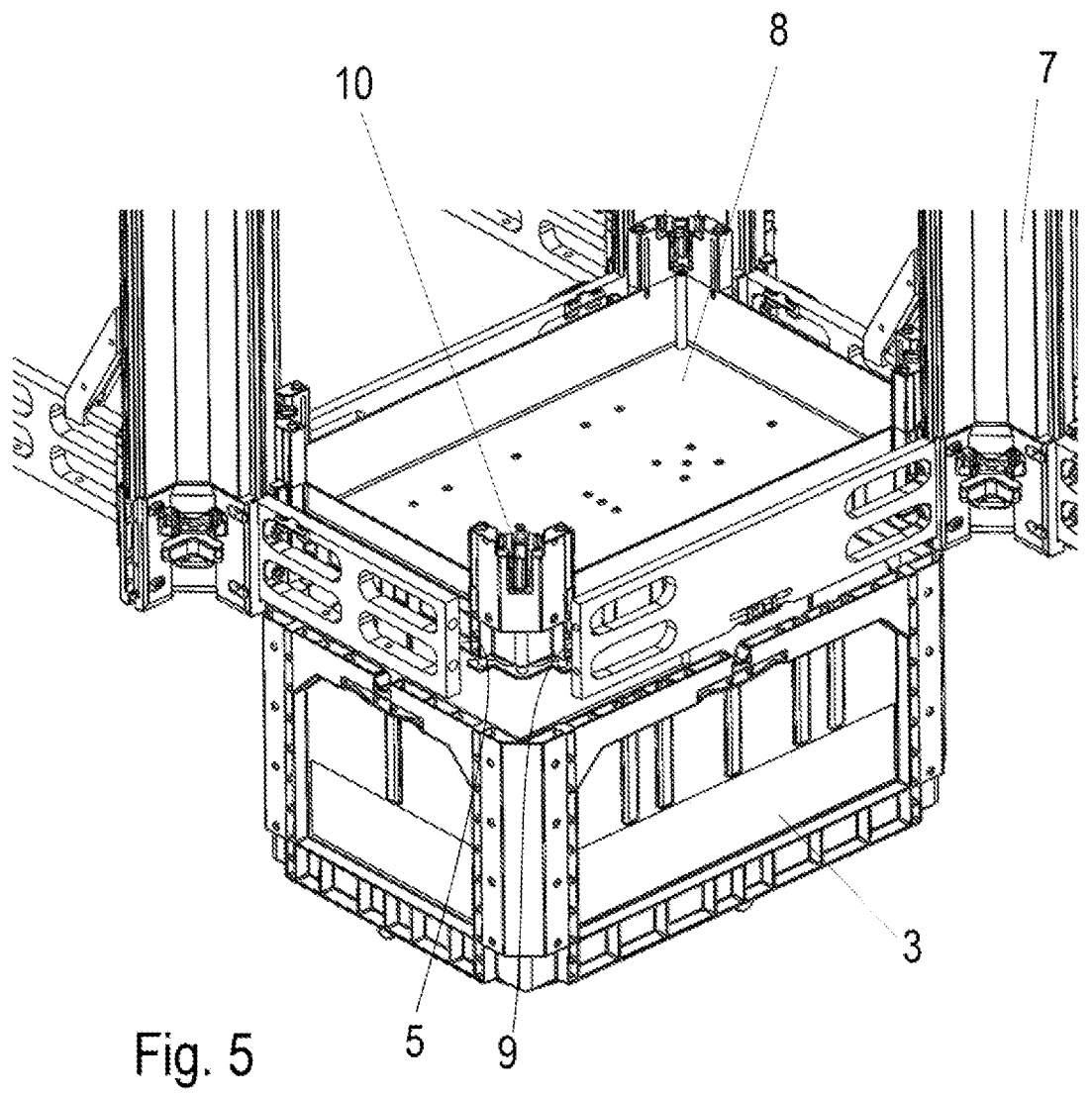
FIG. 5 shows a block storage element shortly before insertion into a block storage element receiving space.

As can be seen in FIG. 5, the centering device has a base 9, which can also be referred to as a frame. The base 9 has an outer contour which is adapted to the inner contour of the opening 5. As long as a block storage element 3 is not in the block storage element receiving space 2, the centering device 9 rests on the holding device 6 and is thus positioned in the opening 5. This positioning can be made with relatively great accuracy. When a block storage element 3 is moved into the opening 5 from below, said block storage element 3 is also positioned relative to the opening 5 with the same accuracy and then comes into form-fitting engagement in the centering device 8. The position of the block storage element 3 transverse to the insertion direction then corresponds to the position of the centering device 8 transverse to the insertion direction.

Above the opening 5, the container receiving space 2 has a larger cross section than the cross section of the opening 5. This cross section is determined by the posts 7 which are arranged at the corners of the opening 5 and thus at the corners of the container receiving space 2. Said posts 7 have a length which corresponds at least to the height of the stack of block storage elements 3. The posts 7 are also subject to a certain tolerance, and therefore a certain distance between the corners of the block storage elements 3 and the posts 7 must be maintained in order to ensure that the movement of the block storage elements 3 in the storage direction is undisturbed.

The centering device 8 has at least one centering element 10 above the base 9 in the direction of gravity, which centering element is designed as a roller in the present case. The centering element 10 is moved by a preloading device 11, which in the present case is designed as a spring, transversely to the insertion direction via the contour of the base 9 in such a way that it can rest against a surface 12 which is arranged on the post 7. The centering element 10 is thus supported on the post 7. In an alternative embodiment, which is shown in FIG. 4, the surface 12 can also have a groove 13 in which the centering element 10 engages. The groove 13 can be, for example, V-shaped or trapezoidal.

The surface 12 extends over the entire height of the block storage element receiving space 2 so that the centering device 8 can also be moved over the entire height of the block storage element receiving space 2 and the centering element 10 can be supported on the surface 12 over the entire movement.

In the present case, the centering device 8 has a centering element 10 at each corner, with a post 7 having a surface 12 being arranged at each corner.

The configuration with the centering element 10, which is pressed outward by the preloading device 11, has the advantage that the centering device 8 can be inserted into the block storage element receiving space 2 through the opening 5. During this insertion, the centering elements 10 can be moved inward transversely to the insertion direction and are only moved outward again after passing through the opening 5.

Figures 6A, 6B, 7A, 7B, 8A, 8B:
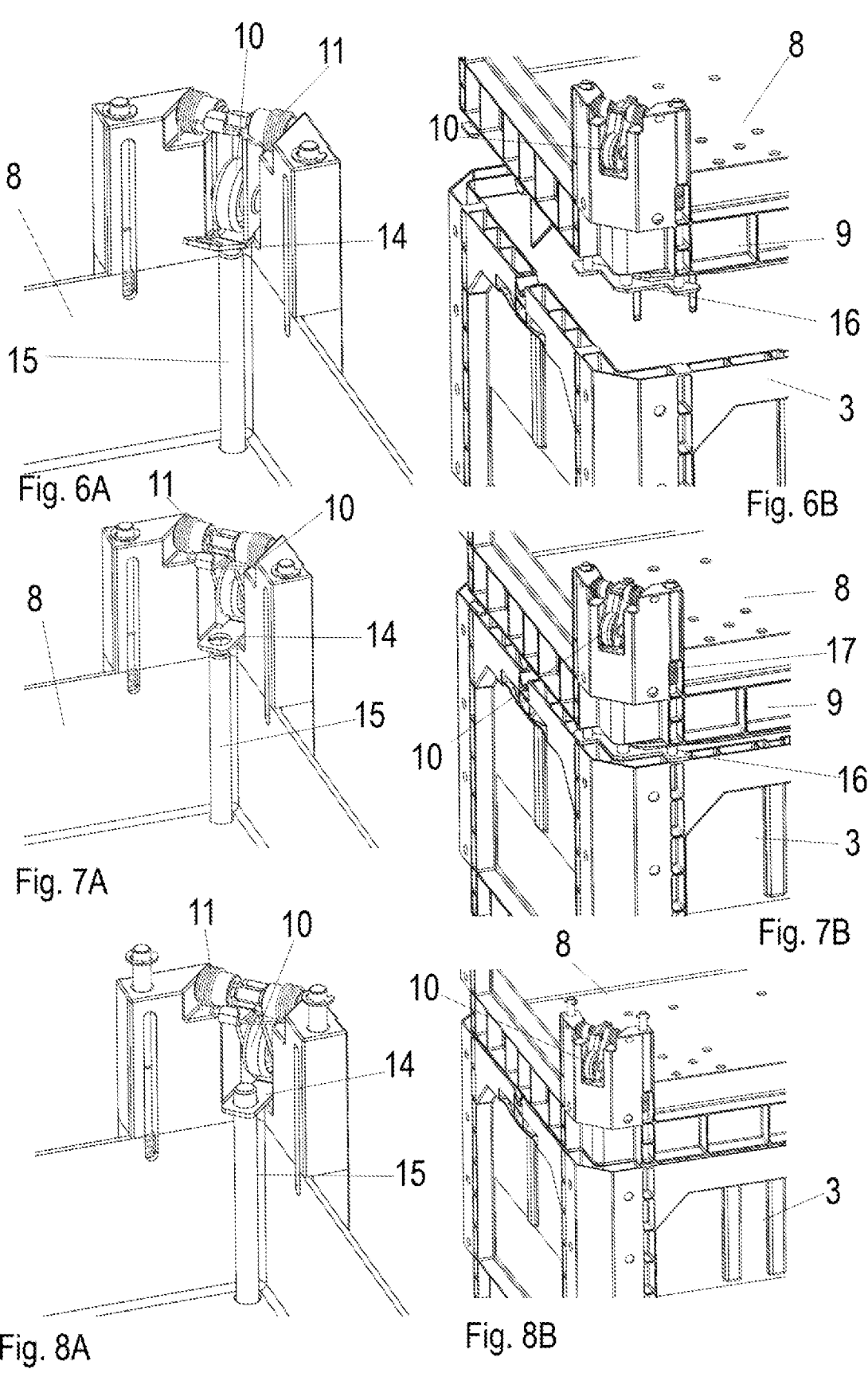
FIGS. 6A and 6B show a first step when inserting a block storage element into the block storage element receiving space.
FIGS. 7A and 7B show a second step when inserting a block storage element into the block storage element receiving space.
FIGS. 8A and 8B show the completion of the insertion of the block storage element into the block storage element receiving space.

The centering element 10 is pivotally mounted on a lever 14. As long as the centering device 8 is still located within the opening 5, the centering element 10 is pivoted inward transversely to the insertion direction using its lever 14, as shown in FIG. 6A.

The centering device 8 has a pin 15 which forms a locking device together with the lever 14. The pin 15 is connected to an actuating device 16 (see FIG. 6B) which projects downward from the base 9 in the direction of gravity. The actuating device 16 can have a spring arrangement 17 (see FIG. 7B) which preloads the actuating device 16 downward in the direction of gravity.

If a block storage element 3 is now inserted into the opening 5 from below, the block storage element 3 comes into contact with the centering device 8 from below and moves the centering device 8 upward in the insertion direction. In this case, the centering element 10 is free from the inner contour of the opening 5 (or it has already been released if the centering element has been moved completely through the opening 5) and pivots outward in order to rest against the surface 12 on the post 7 (FIGS. 7A and 7B). During a further movement, the pin 15 is pushed upward by the actuating device 16 and locks, as can be seen in FIG. 8A, the lever 14 so that the centering element 10 is fixed outwardly pivoted.

In the present embodiment, it is shown that the lever 14 has an opening into which the pin 15 enters. However, it is sufficient in general if the pin 15 can prevent the lever 14 from pivoting inward transversely to the insertion direction. This is generally also the case when the lever 14 rests against the pin 15 from the outside.

If, as shown in FIGS. 8A and 8B, the centering element 10 is fixed in its outwardly moved position and the centering elements 10 located at the other corners are also fixed in their outwardly pivoted position, then, in the ideal case, all centering elements 10 rest on the surfaces 12 on the posts 7. However, this is not absolutely necessary. A small clearance in the order of magnitude of 1 to 5 mm between the centering elements 10 and the surfaces 12 can certainly be allowed so that a stack of block storage elements 3 can only tilt within the scope of this play. This tilting is substantially smaller than tilting which would result if the stack of block storage elements 3 could tilt without a centering device 8 until they rest against a post 7. The centering device 8 is thus used to keep tilting of the stack consisting of block storage elements 3 within a permissible predetermined range.

As described, when the first block storage element 3 is inserted into the container receiving space 2, a form-fitting connection is produced between the block storage element 3 and the centering device 8 so that the centering device 8 holds the block storage element 3 located directly below it in a desired position. If a further block storage element 3 is inserted into the block storage element receiving space 2, then the further block storage element 3 comes into form-fitting engagement with the block storage element already located in the block storage element receiving space 2 and is then held in the desired position by the block storage element 3 located directly there above. The same applies to the subsequent block storage elements. The stack of block storage elements 3 is thus positioned at its upper end in the direction of gravity by the centering device 8 and in its lower end in the direction of gravity by the opening 5. Thus, an orientation of the stack of block storage elements 3 can be ensured, with which maximum permissible tilting is not exceeded.

In a manner not shown in greater detail, the posts 7 can be connected to one another transversely to the insertion direction in order to stabilize one another.

The centering element 10 designed as a roller has, at least on its circumference, a layer made of an elastomer material so that the roller has a running surface which is formed from an elastomer material. The roller can thus compensate for slightly uneven points in the surface 12 and prevent the movement of the centering device 8 from being blocked.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A block storage arrangement comprising:
at least one block storage element receiving space;
a loading space arranged below the block storage element receiving space;
an opening, which is arranged between the block storage element receiving space and the loading space, having a holding device,
wherein a direction from the loading space into the block storage element receiving space defines an insertion direction, in which the block storage element is inserted into the opening from below, and
a centering device, which is arranged in the block storage element receiving space, is movable in the insertion direction in the block storage element receiving space as the block storage element comes into contact with the centering device from below.

2. The block storage arrangement according to claim 1, wherein a plurality of surfaces extending in the insertion direction are arranged at edges of the block storage element receiving space and the centering device interacts with the plurality of surfaces.

3. The block storage arrangement according to claim 2, wherein the plurality of surfaces are arranged on posts extending in the insertion direction.

4. The block storage arrangement according to claim 3, wherein at least some the posts are connected to one another transversely to the insertion direction.

5. The block storage arrangement according to claim 3, wherein the posts are arranged at corners of the opening.

6. The block storage arrangement according to claim 1, wherein the centering device has a base with a peripheral contour which is adapted to a shape of the opening and at least one centering element arranged above the base in the direction of gravity that projects beyond the peripheral contour.

7. The block storage arrangement according to claim 6, further comprising a preloading device coupled to the centering element to apply a force component transversely to the insertion direction outwardly on the centering element.

8. The block storage arrangement according to claim 7, further comprising a locking device arranged to interact with the centering element.

9. The block storage arrangement according to claim 8, further comprising an actuating device, which is activatable from below in the direction of gravity, is arranged to interact with the locking device.

10. The block storage arrangement according to claim 9, wherein the actuating device projects downward from the base in the direction of gravity.

11. The block storage arrangement according to claim 6, wherein the centering element has a roller.

12. The block storage arrangement according to claim 11, wherein the roller has a running surface formed on an elastomer material.

13. The block storage arrangement according to claim 1, wherein a block storage element is positionable below the centering device in the direction of gravity to form-fittingly engage in the centering device.

14. A method for operating a block storage arrangement that includes at least one block storage element receiving space and a loading space arranged below the block storage element receiving space in a direction of gravity, the method comprising:
moving a block storage element into the block storage element receiving space from the loading space through an opening from below,
wherein, in moving through the opening, the block storage element engages a centering device arranged in the block storage element receiving space and raises the centering device, and wherein a form-fitting engagement is produced between the block storage element and the centering device.

15. The method according to claim 14, further comprising locking at least one centering element of the centering device in a position projecting outwardly beyond a base of the centering device while the centering device is supported on the block storage element.

16. The method according to claim 14, wherein the block storage element initially engages an actuation device of the centering device that moves at least one centering element outwardly in a direction transversely to the direction of gravity to engage at least one surface.

17. The method according to claim 16, wherein the at least one centering element comprises a roller.

18. The method according to claim 16, wherein the block storage element receiving space is defined by posts, the at least one surface comprises a surface extending along a length of each post, and the at least one centering element comprises a roller arranged to roll over each surface in the direction of gravity.

19. The method according to claim 14, wherein, before the block storage element is moved into the block storage element receiving space, the method further comprises:

moving the centering device from the loading space to the block storage element receiving space through the opening; and supporting the centering device on a holding device in the opening.

20. The method according to claim 19, wherein, in moving the centering device through the opening, at least one centering element of the centering device is arranged in a retracted position to facilitate moving through the opening.

\* \* \* \* \*